United States Patent
Naser et al.

(10) Patent No.: US 12,181,860 B2
(45) Date of Patent: Dec. 31, 2024

(54) SYSTEM AND METHOD FOR OPERATING AN AUTOMATED MACHINE, AUTOMATED MACHINE, AND COMPUTER-PROGRAM PRODUCT

(71) Applicant: OMRON Corporation, Kyoto (JP)

(72) Inventors: Mohammad Naser, 's-Hertogenbosch (NL); Paolo Viviani, Poirino (IT); Mariya Yurchenko, 's-Hertogenbosch (NL)

(73) Assignee: OMRON CORPORATION, Kyoto (JP)

( * ) Notice: Subject to any disclaimer, the term of this patent is extended or adjusted under 35 U.S.C. 154(b) by 419 days.

(21) Appl. No.: 17/615,373

(22) PCT Filed: May 26, 2020

(86) PCT No.: PCT/IB2020/054962
§ 371 (c)(1),
(2) Date: Nov. 30, 2021

(87) PCT Pub. No.: WO2020/260977
PCT Pub. Date: Dec. 30, 2020

(65) Prior Publication Data
US 2022/0229423 A1    Jul. 21, 2022

(30) Foreign Application Priority Data
Jun. 28, 2019 (EP) .................................. 19183402

(51) Int. Cl.
G05B 19/418 (2006.01)
(52) U.S. Cl.
CPC ............... *G05B 19/41835* (2013.01); *G05B 2219/31229* (2013.01)

(58) Field of Classification Search
CPC ............ G05B 19/0428; G05B 19/4183; G05B 19/042
See application file for complete search history.

(56) References Cited

U.S. PATENT DOCUMENTS

| | | |
|---|---|---|
| 10,051,349 B2 | 8/2018 | Schattmaier et al. |
| 2011/0169345 A1 | 7/2011 | Matsumoto et al. |

(Continued)

FOREIGN PATENT DOCUMENTS

| | | |
|---|---|---|
| CN | 107657681 A | 2/2018 |
| CN | 108415381 A | 8/2018 |

(Continued)

OTHER PUBLICATIONS

International Search Report for International Application No. PCT/IB2020/054962; Date of Mailing, Aug. 24, 2020.

(Continued)

*Primary Examiner* — Mong-Shune Chung
(74) *Attorney, Agent, or Firm* — CANTOR COLBURN LLP

(57) ABSTRACT

Aspects of operating an automated machine include: a database device for storing a plurality of machine safety rules (SRj) in terms of relationships between safety-sensor devices and technical devices, in particular requirements between safety-sensor device description data (DSDi) and technical-device description data (DDi); and a control device implemented: to retrieve the safety-sensor device description data (DSDi) and the technical-device description data (DDi) associated to the technical devices and the safety-sensor devices comprised in the automated machine, to retrieve, from the database device, safety rules (SRj) corresponding to the retrieved safety-sensor device description data (DSDi) and the technical-device description data (DDi), to determine as to whether the retrieved safety-sensor device description data (DSDi) and the technical-device (Continued)

description data (DDi) comply with retrieved safety rules (SRj).

20 Claims, 9 Drawing Sheets

(56) References Cited

U.S. PATENT DOCUMENTS

| | | | |
|---|---|---|---|
| 2012/0203419 A1* | 8/2012 | Tucker | G05D 1/0055 |
| | | | 701/23 |
| 2017/0144307 A1* | 5/2017 | Rublee | B25J 9/1676 |
| 2017/0214902 A1 | 7/2017 | Braune | |
| 2018/0157838 A1 | 6/2018 | Bushey et al. | |
| 2018/0259925 A1 | 9/2018 | Fujimura et al. | |
| 2018/0349654 A1 | 12/2018 | Takeshima et al. | |
| 2019/0226450 A1* | 7/2019 | Theopold | G05B 19/048 |

FOREIGN PATENT DOCUMENTS

| | | | |
|---|---|---|---|
| EP | 2317412 A1 | 5/2011 |
| EP | 3376317 A1 | 9/2018 |
| EP | 3409425 A1 | 12/2018 |
| JP | 2011145877 A | 7/2011 |
| JP | 2018166240 A | 10/2018 |
| WO | 2016079211 A1 | 5/2016 |

OTHER PUBLICATIONS

PCT Written Opinion of the International Searching Authority for International Application No. PCT/IB2020/054962; Date of Mailing, Aug. 24, 2020.

JPO Notice of Reasons for Refusal for corresponding JP Application No. 2021-574273; Mailing Date, Nov. 29, 2022.

JPO Decision of Refusal for corresponding JP Application No. 2021-574273; Mailing Date, Mar. 7, 2023.

CNIPA First Notification of Office Action for corresponding CN Application No. 202080039817.3; Date of Issuance: Mar. 4, 2024; 13 pages.

* cited by examiner

SYSTEM AND METHOD FOR OPERATING AN AUTOMATED MACHINE, AUTOMATED MACHINE, AND COMPUTER-PROGRAM PRODUCT

CROSS REFERENCE TO RELATED APPLICATIONS

This is the U.S. national stage of application no. PCT/IB2020/054962, filed on May 26, 2020. Priority under 35 U.S.C. § 119(a) and 35 U.S.C. § 365(b) is claimed from European Application No. 19183402.7, filed Jun. 28, 2019, the disclosure of which is also incorporated herein by reference.

TECHNICAL FIELD

The present disclosure relates to systems, methods and computer-program products for operating automated machines, such as for operating factory automation systems, industrial networks, and the like. Further, automated machines, automation systems and networks of interacting devices are disclosed. In particular, safety aspects of automation systems including controlled interacting devices are considered.

BACKGROUND

U.S. Pat. No. 10,051,349 B2 discloses a system with plural sensor devices installed at a premises and a server computer coupled to a network and in communication with a gateway, which receives a risk profile for a physical premises, collect sensor information from the plural sensor devices and receives data feeds relevant to a location of the physical premises. Learning models are executed to analyze the collected sensor information and data feeds to produce operational decisions based on the sensor information and data feeds and to predict changes to risk profiles. The system includes an engine for monitoring the sensor devices to recognize occurrences of events, and ask, through an interface to a human for additional information to confirm an occurrence of the events.

In US 2018/0157838 A1, an industrial asset control system is disclosed, wherein a threat-detection model creation computer receives a series of normal monitoring node values (representing a normal operation of the industrial asset control system) and generates a set of normal feature vectors. The threat detection model creation computer also receives a series of threatened monitoring node values (representing a threatened operation of the industrial asset control system) and generates a set of threatened feature vectors. A decision boundary for a threat detection model is calculated based on the set of normal feature vectors, the set of threatened feature vectors, and an initial algorithm parameter. A performance of the decision boundary is evaluated based on a performance metric, and the initial algorithm parameter is tuned based on a result of the evaluation, so that the decision boundary may be re-calculated.

WO 2016/079211 A1 discloses an electromechanical drive system with at least one electromechanical drive unit to actuate a movable component. The electromechanical drive unit comprises a drive unit interface for receiving drive unit control signals, an electromechanical motor controlled by actuation signals to actuate the component, a safety module and a position sensor connected to the safety module via a first data connection.

EP 2 317 412 A1 discloses a safety management system for equipment adapted to operate autonomously in a real-time environment, in which both a deterministic processor and a nondeterministic processor are provided for processing incoming alerts and generating control signals in response.

SUMMARY

It is therefore an object of the present disclosure to provide improved methods and systems of operating automated machines, in particular to improve aspects relating to the safety of such machines.

Thus, according to an aspect of this disclosure, a system for operating an automated machine is presented. The automated machine comprises a plurality of interacting technical devices, wherein each technical device is implemented to perform an associated action, and each technical device has associated technical-device description data including parameters characterizing the respective technical device and at least one safety-sensor device implemented to detect an observable state of a space in/or around the automated machine and implemented to detect a safety issue in said space, a malfunction of the automated machine and/or the safety-sensor device. Each safety-sensor device has associated safety-sensor device description data characterizing the respective safety-sensor device.

The system for operating comprises:
a database device for storing a plurality of machine safety rules in terms of relationships between safety-sensor devices and technical devices, in particular requirements between safety-sensor device description data and technical-device description data;
a control device implemented to:
receive the safety-sensor device description data and the technical-device description data associated to the technical devices and the safety-sensor devices comprised in the automated machine;
retrieve from the database device safety rules corresponding to the retrieved safety-sensor device description data and the technical-device description data; and to
determine as to whether the retrieved safety-sensor device description data and the technical-device description data comply with retrieved safety rules.

According to another aspect, a method for operating an automated machine is disclosed, wherein the automated machine comprises:
a plurality of interacting technical devices, each technical device being implemented to perform an associated action, wherein each technical device has associated technical-device description data including parameters characterizing the respective technical device; and
at least one safety-sensor device implemented to detect an observable state of a space in/or around the automated machine and implemented to detect a safety issue in said space, a malfunction of the automated machine and/or the safety-sensor device, wherein the safety-sensor device has associated safety-sensor device description data characterizing the respective safety-sensor device.

The method for operating comprises the steps of:
retrieving, from a database storing a plurality of machine safety rules in terms of relationships between safety-sensor devices and technical devices, in particular requirements between safety-sensor device description data and technical-device description data, the safety-sensor device description data and the technical-device description data associated to the technical devices and the safety-sensor devices comprised in the automated machine;

retrieving from the database safety rules corresponding to the retrieved safety-sensor device description data and the technical-device description data; and determining as to whether the retrieved safety-sensor device description and the technical-device description data comply with the retrieved safety rules.

Additionally, according to yet another aspect, a computer program product is disclosed, including computer-readable instructions causing a computing system including one or more processing devices in response to executing the computer-readable instructions, to:

retrieve from a database storing a plurality of machine safety rules in terms of relationships between at least one safety-sensor device and at least one technical device, in particular requirements between safety-sensor device description data and technical-device description data, the safety-sensor device description data and the technical-device description data associated to the technical devices and safety-sensor devices comprised in an automated machine;

retrieve, from a database, safety rules corresponding to the retrieved safety-sensor device description data and the technical-device description data; and to determine as to whether to retrieve safety-sensor device description data and the technical-device description data comply with the retrieved safety rules.

The automated machine referred to may comprise:

a plurality of interacting technical devices, each technical device being implemented to perform an associated action wherein each technical device has associated technical-device description data including parameters characterizing the respective technical device; and at least one safety-sensor device implemented to detect an observable state of a space in and/or around the automated machine and implemented to detect a safety issue in said space, a malfunction of the automated machine and/or the safety-sensor device wherein each safety-sensor device has associated safety-sensor device description data characterizing the respective safety-sensor device.

In the systems and methods for operating an automated machine, in particular a control device comprising a plurality of processing devices, may autonomously assess as to whether the automated machine fulfills given safety rules that may be, for example, prescribed by certain regulations or standards.

The machine safety rules may be rules indicating how the safety-sensor device description data and the technical-device description data should be linked to each other to satisfy given a plurality of safety rules stored in the database device, which are for example prescribed by certain regulation or standards. More globally, the machine safety rules can indicate which combinations of safety-sensor devices and technical devices should be used together to fulfill the given safety rules. The machine safety rules are, for example, expressed as a table indicating, for each technical device, which safety-sensor devices are necessary to fulfill given safety rules and/or indicating, which safety-sensor device description data is necessary to fulfill given safety rules when a certain technical-device description data is given and vice versa. In the present application, the term "requirement" in particular relates to necessary combinations to fulfill given safety rules.

When determining whether the retrieved safety-sensor device description data and the technical-device description data comply with retrieved safety rules, the control device in particular compares the retrieved safety-sensor device description data and the retrieved technical-device description data with the retrieved safety rules and determines whether they are compliant. For example, if the retrieved safety rules indicate that if the technical device has a predetermined technical-device description data, then a safety-sensor device with a predetermined safety-sensor device description data should be used, then the control device may check whether the retrieved technical-device description data corresponds to the predetermined technical-device description data stored in the machine safety rules and whether the retrieved safety-sensor device description data corresponds to the predetermined safety-sensor device description data stored in the machine safety rules. If yes, a compliance is determined.

The above-described system comprises multiple interacting technical devices which share a database device and a control device. The database device and the control device are hence shared between multiple entities (technical devices and safety-sensor devices) of the system for operating the automated machine, thereby advantageously allowing to take into account relationships between the individual entities of the system.

The control device may be implemented as an artificially intelligent unit capable of machine learning aspects, data mining, feature extraction or pattern recognition in an autonomous fashion.

Interacting technical devices can be, for example, field devices in an automation network or production units that are controlled to execute the associated actions.

Safety-sensor devices can be understood as monitoring the interacting technical devices and issuing safety warnings if, according to particular operational situations, a safety action needs to be taken. If, for example, personnel enter the particular observable state in a space, a safety-sensor device may issue a warning or an instruction to stop certain actions of the technical devices.

It is understood that the safety-sensor devices, in particular, have a self-diagnosis function so that a malfunction of the safety-sensor device is noticed and may be remedied.

Generally, description data for technical devices, sensor devices, safety-sensor devices or the automated machine include, in particular computer-readable, information on the respective entity. For example, safety-sensor device description data associated to a time-of-flight sensor used as a safety-sensor device may include a list of product features and parameters how the time-of-flight sensor can be used. Similarly, the technical devices used in the automated machine can be specified by certain description data, in particular in a standardized computer-readable fashion.

It is understood that the description data can be used to physically implement the automated machine, and in particular safety functions within the automated machine. In embodiments, the database device storing a plurality of machine safety rules may comprise a data repository containing safety standard recommendations for machine configurations including technical devices and sensor devices and/or publicly available information documents.

In embodiments of the system and method for operating an automated machine, the control device is implemented to:
receive machine description data characterizing at least the interaction of the technical devices; and to
determine as to whether the retrieved safety-sensor device description data, the technical-device description data and the machine description data comply with the retrieved safety rules.

For example, the automated machine can be described in terms of a specific profile, if certain technical devices, for example conveyor devices or specific robots, are deployed. Safety standards may then prescribe that safety sensors with specific properties should be used in such a system.

The determination whether the retrieved safety-sensor description data, the technical-device description data and the machine description data comply with the retrieved safety rules may be performed along the same lines as the above-described determination as to whether the retrieved safety-sensor description data and the technical-device description data comply with the retrieved safety rules, wherein the machine description data are further taken into account. The machine description data in particular form a further requirement for the safety rules to be complied with.

In embodiments, the control device is implemented to monitor the technical devices, the sensor devices and/or the safety-sensor devices in particular detect a change in the technical device, a sensor device, a safety-sensor device and/or an amendment in the technical-device description data or safety-sensor device description data.

During the use of an automated machine, technical devices may be replaced or safety-sensor devices change their behavior due to wear or aging effects. Further, personnel may rearrange the interacting technical devices so that the technical-device description data and/or the machine description data is altered. Advantageously, the control device monitors and detects such amendments and can initiate actions to improve or reinstate the proper safety of the automated machine.

In embodiments, a change may include a replacement. Wear, age, life cycle, operational times, operational mode, operating range of the technical device, a sensor device or a safety-sensor device.

Consequently, in embodiments, the control device is implemented to, in response to a detected change or amendment, determine if the applicable safety rule is complied with. For example, the control device issues a warning message, if there is a breach of a safety rule due to a change or amendment in the automated machine.

The determination whether the applicable safety rule is complied with may be performed along the same lines as the above-described determination as to whether the retrieved safety-sensor description data and the technical-device description data comply with the retrieved safety rules. In particular, the compliance check is performed again regularly and/or whenever a change or amendment occurs, in order to always know whether the machine safety rules are satisfied.

In embodiments, the system may further comprise a communications network implemented to communicatively couple the control device, technical devices, sensor devices and/or the safety-sensor devices. The communications network may be used to retrieve description data and transmit control data within the automated machine. A communications network can be based on an Ethernet standard or, for example, an 10-link standard at the time of the priority date of this application.

In embodiments, the description data has a predetermined format. For example, the predetermined format for a technical device or a sensor device or a safety-sensor device can be written as the device description in terms of the 10-link standard.

Likewise, in embodiments, the machine safety rules are received in a predetermined computer-readable format, extracted from safety standard documents in text form, scanned by means of a pattern or text recognition and/or a by natural language processing. Retrieving the machine safety rules and/or description data may include receiving a manual input by an operator.

In embodiments, a control device is implemented to automatically analyze safety standard documents and to generate the safety rules in a computer-readable predetermined format. Thus, the control device may extract the relevant content of a safety standard document as a function of the machine description data to obtain the relevant safety rules. Additionally, the control device may identify based on the retrieved machine description, including the machine configuration times and connections of sensor and technical devices, the correct applicable standard documents.

The control device may be implemented as a machine learning device, e.g. a neural network, which is specifically trained to extract safety rules from safety standard documents. For example, the standard documents considered are safeguarding and risk assessment documents according to ISO 12100 at the time this application is filed. The referred safety standard documents are in particular ISO or IEC standards referring to automation networks. As an example, ISO standards 12100, 14120, 13854, 13857, 13855, 138491, 138492. 13856, 61496, 13851, 60204, 14119, 13850, IEC 61496 and the like are mentioned.

Thus, in embodiments, determining if the retrieved data complies with the safety rules includes a machine learning process, an expert system, monitoring and/or retrieving description data from an external environment of the automated machine and/or receiving manual input.

In embodiments, the system may further comprise a further database device implemented to provide expert data for resolving conflicts between safety-sensor device description data, technical-device description data, machine description data and/or safety rules.

The control device may further be implemented to:
detect a conflict between the retrieved safety-sensor device description data, the technical-device description data and the retrieved safety rules; and to
generate amended safety-sensor device description data, amended technical-device description data and/or amended machine description data.

A conflict is in particular detected when it is determined that the retrieved safety-sensor device description data and the retrieved technical-device description data do not comply with the retrieved safety rules. The amended safety-sensor device description data, amended technical-device description data and amended machine description data preferably comply with the retrieved safety rules.

Thus, the control device may continuously improve the safety of the automated machine. In embodiments, iteratively, amended description data is generated and tested to improve the safety of the system. Alternatively or additionally, amended device description data can be generated to improve the efficiency of the automated machine.

In particular, the amendments of the safety-sensor device description data, technical-device description data and/or machine description data are made according to the operation of the automated machine, a profile of the safety-sensor devices, compatibility with safety standards and/or previous knowledge, incidents, failures and/or accidents.

If a conflict is detected, a human user can be informed of the conflict and update the safety-sensor device description data, the technical-device description data and/or the machine description data. If a similar or same conflict has been detected before, the system can provide the human user with a suggestion on how to amend the safety-sensor device description data, the technical-device description data and/or the machine description data. The user may decide whether to implement the suggestion or not.

Suggestions on how to adjust the safety-sensor device description data, the technical-device description data and/or the machine description data can also be generated by Machine Learning techniques and/or other analytical systems.

In further embodiments, the automated machine further comprises a machine controller device implemented to generate control data for controlling the plurality of interacting technical devices and to receive sensor data and/or safety sensor data generated by the safety-sensor device and/or a sensor device. The control data is preferably generated as a function of the sensor data and the safety sensor data and according to a predetermined control algorithm. The control algorithm, for example, defines the function of certain aspects within the automated machine. For example, an algorithm may cause a robot to put items from a conveyor into a basket, wherein the basket, conveyor and robot may be considered a technical device each.

In embodiments, the control device for operating the system is implemented to monitor the control data, the sensor data and/or the safety sensor data during the operation of the automated machine. In embodiments, the control data sensor data and safety sensor data is referred to as process data.

Monitoring an acquiring process data allows the control device to analyze the operation of the automated machine and potentially amend the machine configuration data or safety rules in order to render the automated process more efficient or safer. The control device for operating the automated machine may issue messages or reports, that include amended description data based on the analysis of process data and/or changes in the description data.

In embodiments, amended description data is checked and eventually used to implement physically an amended automated machine based on the amended description data.

In embodiments, the control device is implemented to calculate a safety performance indicator (SPI) relating to the safety of the automated machine; and to amend the safety-sensor device description data, technical-device description data and/or the machine description data such that the safety performance indicator is improved.

The safety performance indicator may be defined as to provide a safety level or measure for the safety of the automated machine. In embodiments, the safety performance indicator has a low value for a low safety level and a high value for a high safety level.

In embodiments of the automated machine, at least one of the interacting technical devices is an actuator device, a robotic device, a transport device, a conveyor device and/or a sensor device. One may contemplate other technical devices used within an automated machine or network.

In embodiments, the at least one of the safety-sensor devices includes a light curtain device, a time-of-flight sensor device, a motion detector, a radar transmission and/or detection device, an ultrasonic transmission and/or detection device, a laser scanner device, a photoelectric device and/or a camera device. One may contemplate of other safety-sensor devices used within an automated machine or network.

According to a further aspect of this disclosure, an automated machine is disclosed. Embodiments of the automated machine comprise:
  a plurality of interacting technical devices, each technical device being implemented to perform an associated action wherein each technical device has associated technical-device description data including parameters characterizing the respective technical device;
  at least one safety-sensor device implemented to detect an observable state of a space in/or around the automated machine, an implementer to detect a safety issue in said space and no function of the automated machine and/or the safety-sensor device where each safety-sensor device has associated safety-sensor device description data characterizing the respective safety-sensor device.

The automated machine further comprises a system according to the aspects above or below described with respect to further embodiments.

It is understood that the actions performed by the control device for controlling an automated machine can alternatively be implemented by method steps in a method for operating the automated machine. For example, the function to retrieve the safety-sensor device description data may be translated into a step of retrieving the safety-sensor device description data. It is understood that aspects with regard to the functions of the system for controlling are equally disclosed in terms of method steps herein.

According to a further aspect, this disclosure relates to a computer program product comprising computer-readable instructions causing a computing system including one or more processing devices, in response to executing the machine-readable instructions, to perform the above-described methods and functions for operating an automated machine.

In embodiments, computer-program product comprises a program code for executing the above-described methods and functions by a computerized control device when run on at least one control computer. A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

BRIEF DESCRIPTION OF DRAWINGS

Further embodiments, features and advantages of the present invention will become apparent from the subsequent description and dependent claims, taken in conjunction with the accompanying drawings, in which:

In the Figures, like reference numerals designate like or functionally equivalent elements, unless otherwise indicated.

DETAILED DESCRIPTION

Figure 1:
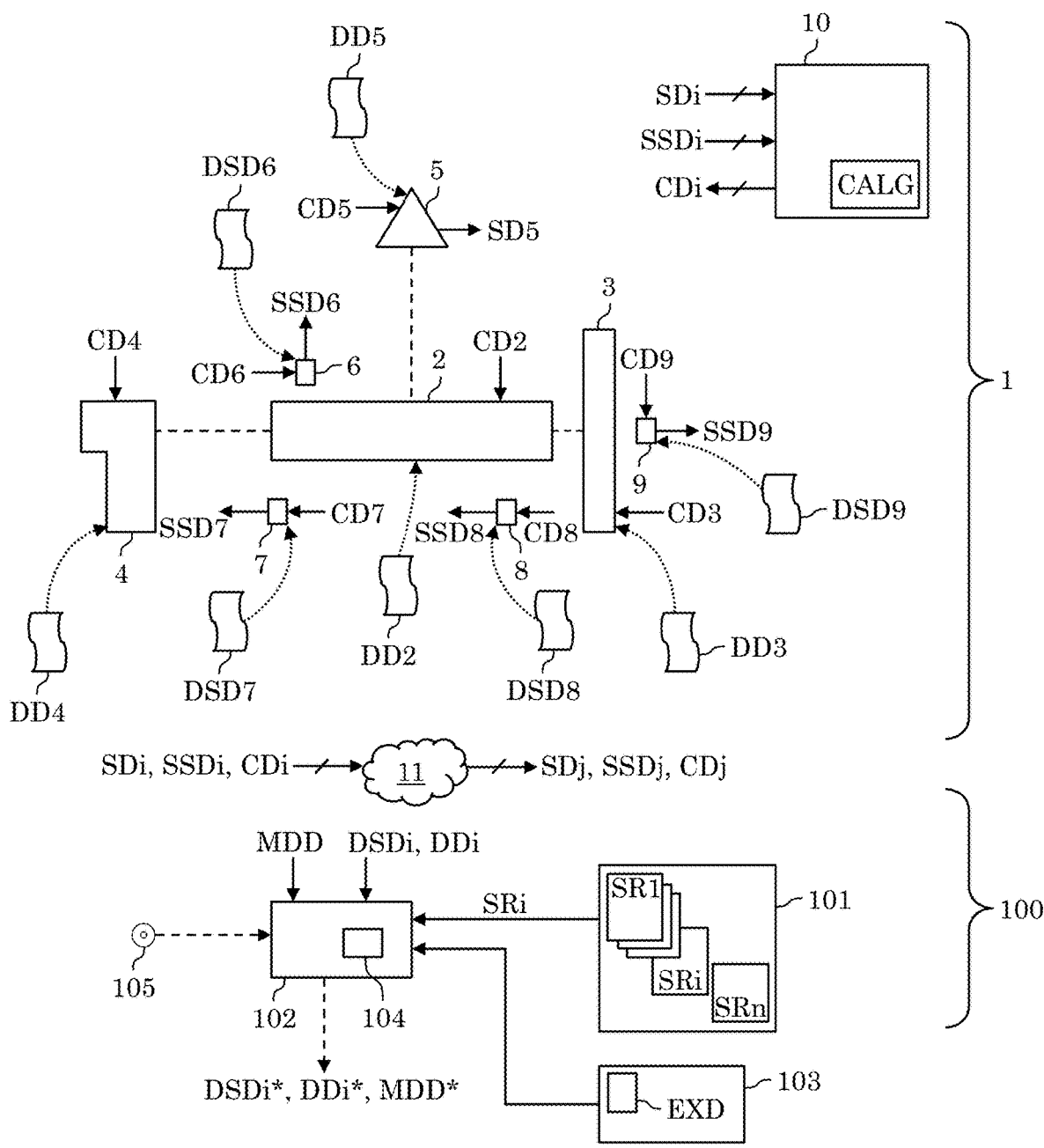
FIG. 1 shows a schematic diagram of an embodiment for an automated machine and a system for operating the automated machine.

FIG. 1 shows a schematic diagram of an embodiment for an automated machine and a system for operating the automated machine according to aspects of this disclosure.

In the orientation of FIG. 1, the upper part 1 refers to an automated machine 1 comprising a plurality of interacting technical devices 2, 3, 4, 5. The automated machine 1 can be implemented as an industrial automation network or an automated factory floor, where production units interact with each other and perform certain actions, each. For example, a technical device 2 can be a conveyor for conveying items produced in the technical device 4 to a robot 3 performing another action with the conveyed item. Thus, in embodiments, the interacting technical devices 2, 3, 4, 5 wherein the interaction is indicated by the dashed lines can be regarded as production units or field devices in an automation network. As an example, technical device 5 is implemented as a sensor, for example, monitoring the items conveyed on the conveyer device 2.

In the following, it is referred to production units 2, 3, 4 and a sensor 5 forming this example of an automated machine 1. The automated machine 1 also comprises a machine controller 10 which is communicatively coupled to the production units 2, 3, 4 and the sensor 5 through a communications network 11. The machine controller 10 receives a plurality of sensor signals or sensor data SDi and generates control data CDi for the respective production unit 2, 3, 4, wherein i indicates the i-th production unit. Generally, the machine controller 10 coordinates the operations of the production units 2, 3, 4 according to a control algorithm CALG, for example to perform the combined action of the interacting production units 2, 3, 4. A specific adjustment of the operation of the production units 2, 3, 4 can be realized by monitoring the operation by the sensor 5. In FIG. 1, the production units 2, 3, 4 receive the control data CD2, CD3, CD4 and operate accordingly. Further, a sensor 5 may also receive control data CD5 and generates sensor data SD5 to be used by the machine controller 10.

In order to ensure the safety of the automated machine 1, safety-sensor devices 6, 7, 8, 9 are provided that each or cooperatively monitor an observable state in a space in or around the automated machine 1 or the interacting production units 2, 3, 4.

Safety-sensor devices 6, 7, 8, 9 can be implemented to detect a malfunction of the or a part of the alternated machine 1 and provide safety sensor data SSDi, e.g. transmitted through the communications network 11 to the machine controller 10. This is indicated by the arrows referring to SSDi. For example, safety sensor data SSD9 refers to the safety sensor 9.

There exist safety standards that should be obeyed when automated systems, such as presented in the upper part of FIG. 1, are configured. In the following, it is referred to particular safety rules SRj for automated systems or machines which may be derived for example from safety standards, such as ISO 11161 specifying safety requirements for integrated manufacturing systems in its present version at the time of filing this application.

For example, a safety standard or a safety rule (SR) may prescribe that the safety-sensor device 8 placed between the conveyor 2 and a robot 3, if implemented as a camera, must have a certain visual field. Other requirements contained in safety rules may relate to the type of a sensor or performance indicators, such as a response time or accuracy in sensing.

Figure 3:
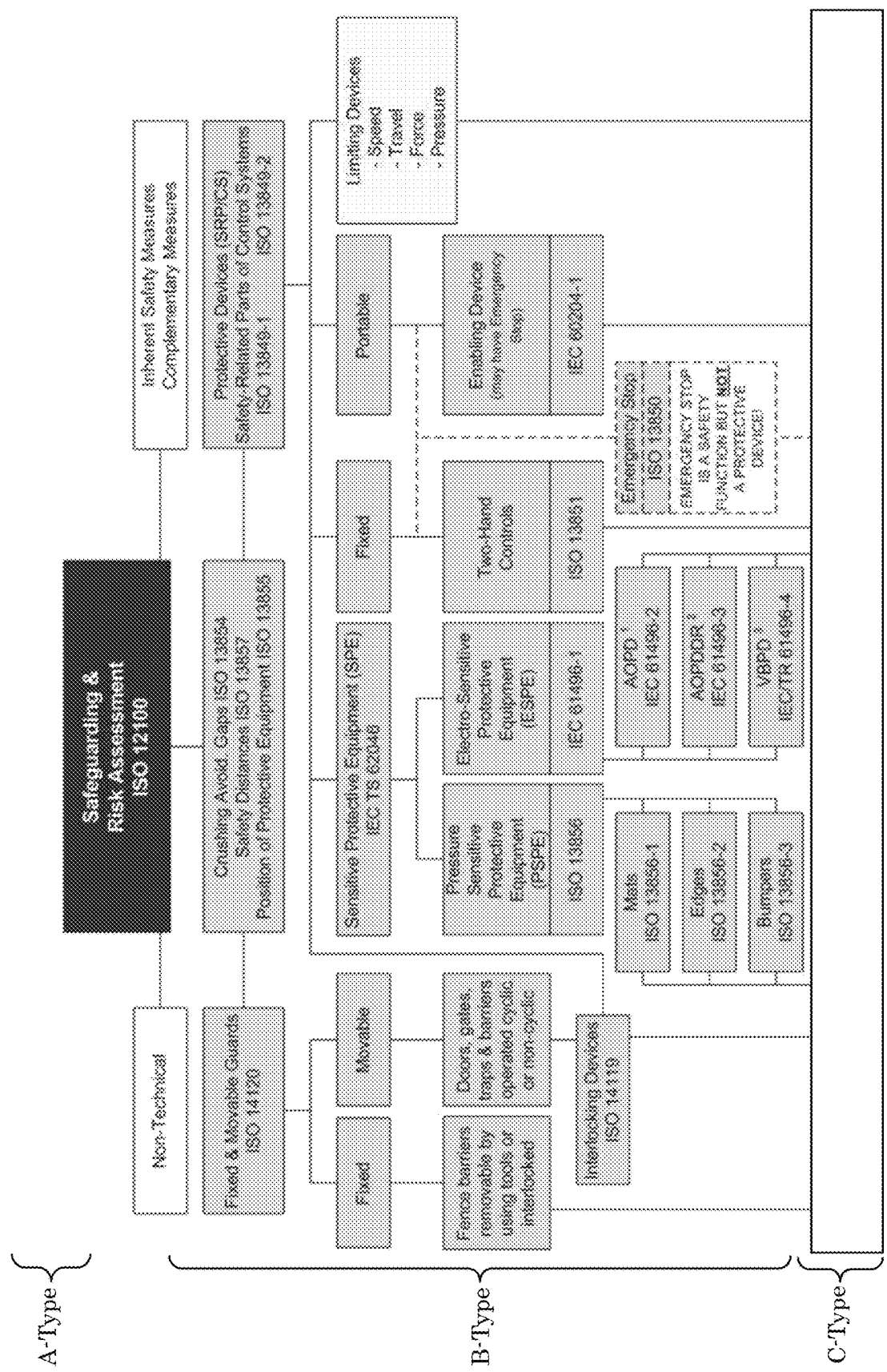
FIG. 3 shows a schematic diagram of embodiments for safety rules for an automated machine.

FIG. 3 shows a schematic diagram of embodiments for safety rules for an automated machine in terms of standards. For example, the ISO 12100 standard on safeguarding a risk assessment in technical systems is considered an A-type standard for safety. Further, B-type safe rules or standards are shown in FIG. 3 below the ISO 12100, which is written as a black box on top. The plurality of standards e.g. shown as B-type standards need to be assessed and analyzed with respect to the configuration of the automated machine under consideration. For example, aspects relate to fixed movable elements in an automated machine, such as fence barriers or movable gates wherein safety is usually discussed in ISO 14120. It is understood that the FIG. 3 diagram is not limiting the disclosure of this application. Rather, alternative or other safety rules, such as further specific C-type safety rules which are only indicated as a lower box in FIG. 3 may be considered as well.

Turning back to FIG. 1, a system 100 for operating the automated machine 1 is depicted on the lower part of the figure. The system for operating 100 includes a control device 102 including at least one processing device 104. The control device 102 can be seen as a computerized system, such as an industrial PC adapted to execute a computer program provided, for example, through a computer product 105 in terms of a data carrier or a down-loadable file.

The control device 102 can be coupled to the elements of the automated machine 1 through the communications network 11 and retrieve and exchange data. In particular, the process data in the automated machine 1 including the control data CDi, the sensor data SDi and safety sensor data SSDi can be monitored by the control device 102.

Additionally, the control device 102 is implemented and communicatively coupled to a database device 101. The database device 101 contains a data repository including safety rules, for example in terms of the standard documents shown in FIG. 3.

In the automated machine 1 to each of the devices, i.e. the production units 2, 3, 4, the sensor 5 and the safety-sensor devices 6, 7, 8, 9 associated description data in terms of a computer-readable file is associated. This is indicated in FIG. 1 by the dotted arrows relating, for example, the technical-device description data DD4 to the technical device 4. Analogously, safety sensor description data DSDi is associated to the i-th safety sensor. Sensor-device description data DD5 is associated to the sensor device 5, and technical-device description data DD2, DD3, DD4 is associated to the production unit 2, 3, 4, respectively.

The description data characterizes the respective device in terms of parameters, for example in a standardized fashion. For example, an 10-link profile for a certain field device used as a production unit can be used or considered as description data.

The entire configuration of the automated machine 1 can be captured in terms of machine description data MDD. The machine description data describes how the technical devices 2, 3, 4, the sensor device 5 and the safety devices 6, 7, 8, 9 interact and work with each other. For example, the layout of a factory automation system, the operational modes and other details can be included into the machine description data. In order to ensure a proper safety according to safety standards, the system for operating 100, in particular the control device 102, retrieves the safety sensor data SSDi, the technical-device description data DDi and the machine description data for further evaluation. The machine description data MDD can be input manually through a user interface or, for example, retrieved from a server or cloud service. The same holds for the description data DSDi, DDi and further retrieved or gathered safety rules SRj.

Figure 2:
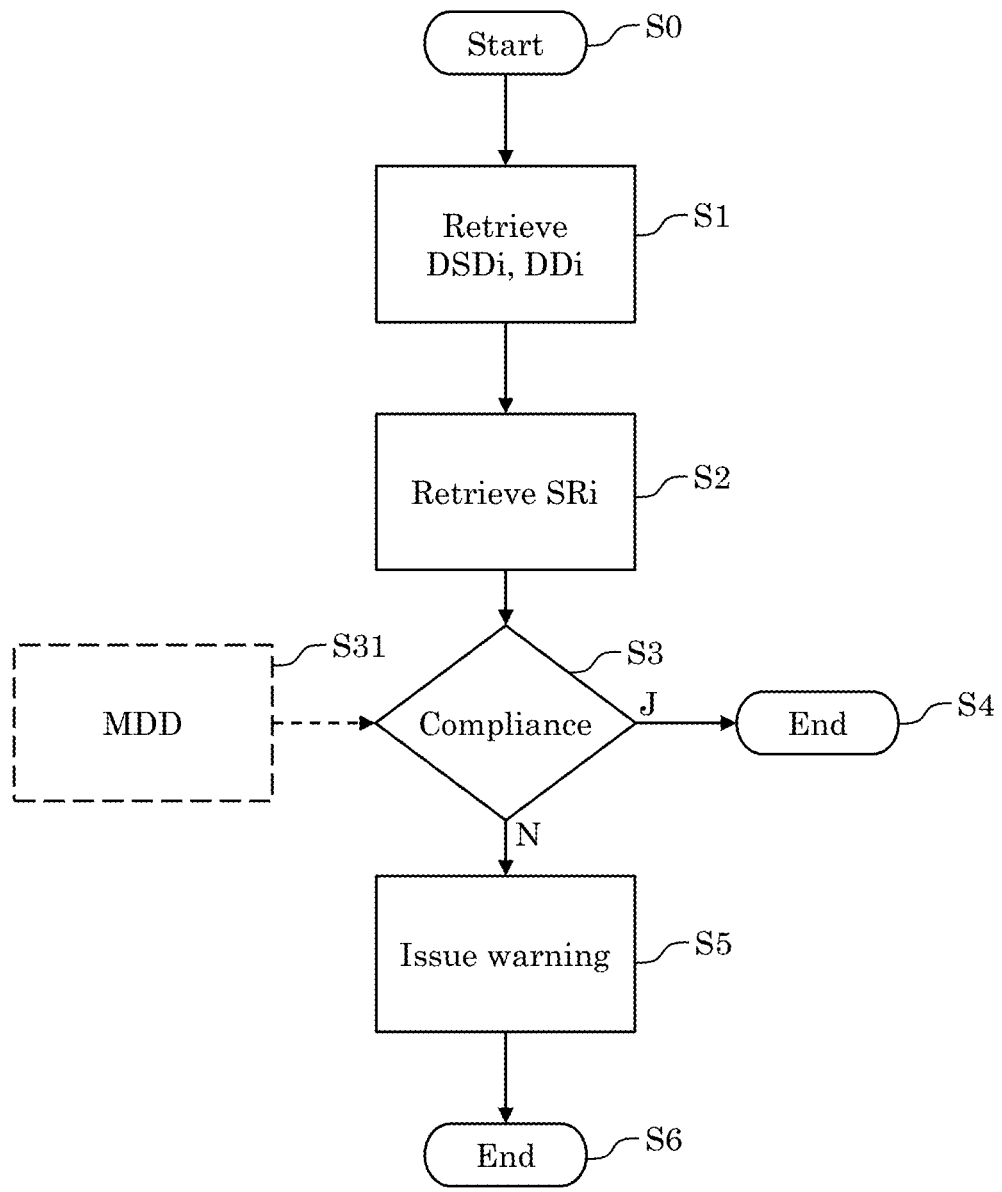
FIG. 2 shows a process flow involving method steps of a first embodiment for a method for operating an automated machine.

The mode of operation of the automated machine 1 through the system 100 can be depicted in terms of a method for operating the automated system 1. The method is in particular implemented by functions of the control device 102 shown in FIG. 1. FIG. 2 shows a process flow involving methods steps of a first embodiment for a method for operating the automated machine 1, e.g. through the control device 102. The method for operating the automated machine 1 in particular takes into account safety aspects and preferably leads to a fulfillment of all safety standards required when the automated machine 1 is operated.

In step S0, the process for the automated machine operation 1 starts. First, the controller device 102 retrieves or gathers a description data DSDi (i=6, 7, 8, 9) for the safety sensors 6, 7, 8, 9. In the same step S1, the technical-device description data DDi (i=2, 3, 4, 5) of the production units 2, 3, 4 and sensor 5 is retrieved. Next, safety rules SRj applicable to the production units 2, 3, 4, sensor 5 and safety sensor devices 6, 7, 8, 9 are retrieved from the database 101.

In step S3, the control device 102 determines if the implemented safety-sensor devices 6, 7, 8, 9 in terms of their description DSD6-DSD9 fulfill the safety requirements SRj. In particular, in step S31, the machine configuration in terms of the machine description data MDD is considered during the compliance check in step S3.

If the configuration according to all description data MDD, DSDi, DDi complies with the extracted safety rules SRj from the relevant safety standard (see, for example, FIG. 3) the process is ended in step S4.

If there is a safety breach, for example an inappropriate safety sensor is present in the automated machine, a warning message is issued in step S5. Additionally, the control device 102 may issue an instruction to stop the operation of the automated machine 1. Generally, the warning message issued in step S5 may trigger an action by maintenance personnel and leads to an end of the method in step S6.

If it is decided or checked in step S3 that the combined description data MDD, DSDi, DDi comply with the security rules SRj, no particular action is taken and the operation of the automated machine 1 may pursue according to the control algorithm CA0G. Hence, in step S4, the method is ended.

The method steps shown in FIG. 2 may be executed, for example, when the automated machine 1 is booted or at regular time intervals or if certain operational issues occur. For example, a method depicted in FIG. 2 can be carried out after a shut-out due to a safety issue detected by a safety sensor device 6, 7, 8, 9 that occurred in the automated machine 1.

Figure 4:
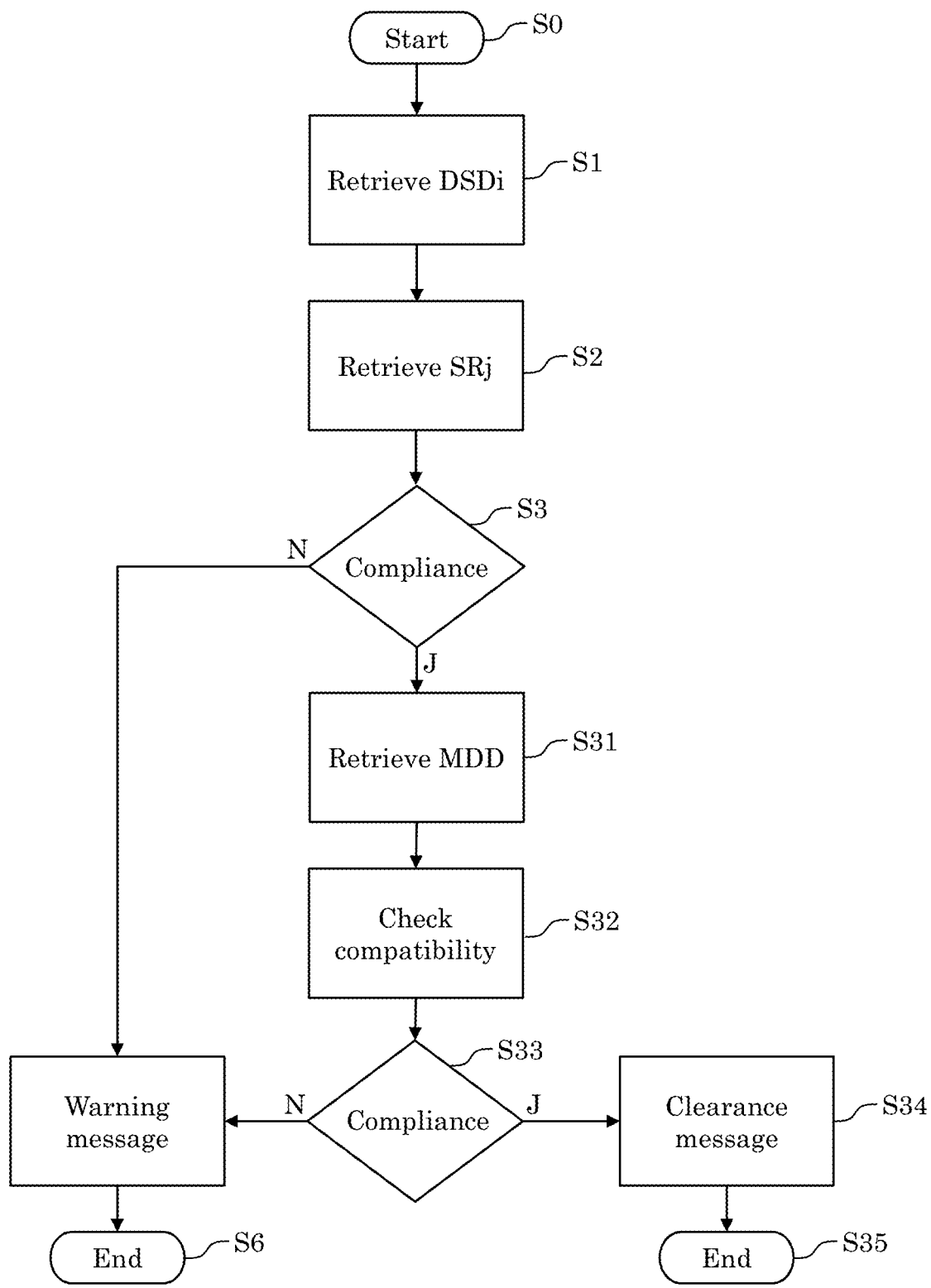
FIG. 4 shows a process flow involving method steps of a second embodiment for a method for operating an automated machine.

FIG. 4 shows a process flow involving method steps that can be executed additionally or alternatively to the first embodiment of a method for operating an automated machine. In step S0, the control process for operating the automated machine 1 starts. First, in step S11, in particular the control device 102 (see FIG. 1) retrieves the safety sensor description data DSDi. Hence, the control device 102 obtains the safety sensor information in terms of parameter files, for example IO-link device description data. One can contemplate of alternative computer-readable description data characterizing the safety sensors.

Further, in step S2, safety rules SRj are retrieved from an available database, such as database 101 shown in FIG. 1.

In the following step S3, it is determined if the safety sensors or the safety sensor description DSDi comply with the relevant safety standards for the application under consideration in the automated machine 1. For example, in case of a synchronous link control (SLC), the used safety sensors should comply with standards ANSI B11.19, IEC 61496-1/-2, IEC TS62046, ISO 13855 (EN 999). If the control device 102 determines that the safety sensors according to the device description data DSDi do not comply with the relevant safety standards, a warning message is issued in step S5. Hence, the relevant device is marked as unsafe. However, if in step S2 it is determined that the safety sensor complies with safety rules in terms of the safety standards, the machine profile or machine description data MDD is retrieved in step S31.

The machine description data MDD provides the technical specification of the machine so that in the next step S32, the control device 102 determines if the technical aspects in terms of the machine description data MDD and the suitable safety-sensor devices in terms of the safety-sensor device description data DSDi that passed the compliance test in step S1 match with each other.

In step S33, for example, the controller 102 may determine that the considered sensor device description data for a specific safety-sensor device does not match with the technical-device description data DDi prescribed in the machine description data MDD. Then, a warning message issued in step S5 and the process is ended in step S6.

If, however, the compliance check in step S33, results in a match between the machine description data MDD, safety sensor description data DSDi and technical-device description data DDi, a clearance message is issued in step S34. Hence, it is concluded that a safety-sensor device according to the safety sensor description data check through the compliance checks S3 and S33 can be used in the automated machine, and the process is ended in step S35. Eventually, the real safety-sensor device can be placed and integrated into the automated machine, thereby leading to a safe and secure operation of the automated machine according to the relevant safety standards.

In further embodiments or alternatives of the method for operating safely an automated machine, the compliance checks in terms of steps S3 and S33 can be triggered by a change in the automated machine in terms of an environmental change or a change in the operation mode, a change in the sensor or technical device properties. For example, if an operator changes a certain safety-sensor device, the control device 102 will check if the replacement safety sensor fulfills all safety requirements.

Figure 5:
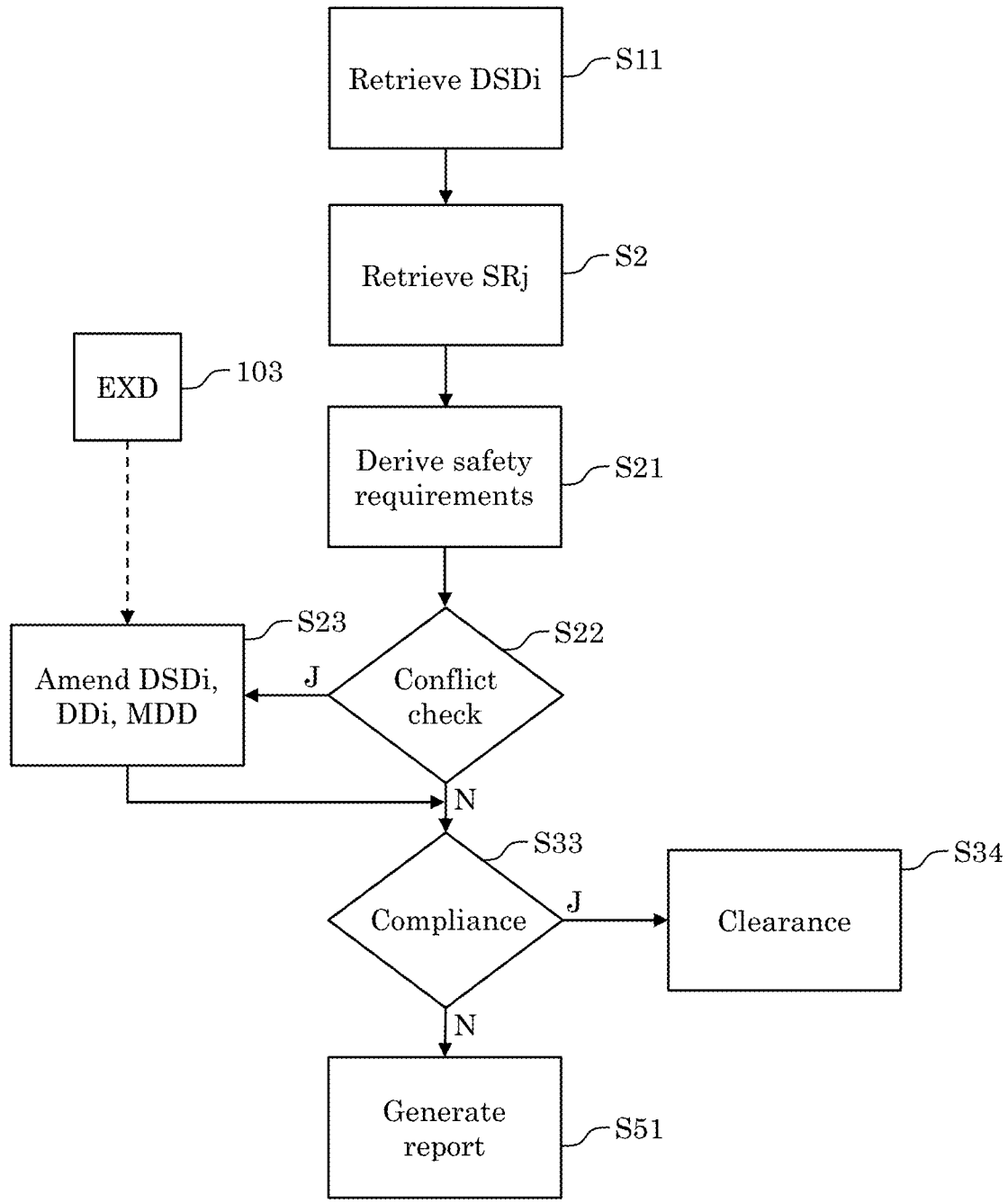
FIG. 5 shows a process flow involving method steps of a third embodiment for a method for operating an automated machine.

In FIG. 5, a process flow involving method steps of a third embodiment for a method or for operating the automated system, e.g. of FIG. 1, is shown. The method steps disclosed and described in FIG. 5 can be executed additionally to the method steps shown in other embodiments.

In FIG. 5, further aspects of conflict checks and compliance checks of safety relevant devices in automated system are shown. In a first step S11, the safety sensor description data DSDi is obtained, for example from a web service or a database or document characterizing the safety-sensor devices. This can be, for example, a database provided by a manufacturer of safety-sensor devices.

Next, as in the process of FIG. 4 in step S2, the relevant safety rules SRj are retrieved. A safety standard database 104 as shown in FIG. 1 can be used to retrieve the relevant information regarding the retrieved safety-sensor description data SDSi in step S11. The relevant information can be extracted from the standard documents, for example, by a pattern or text recognition module or by a natural language processing module in the control device 102, if safety rules are recorded orally.

In step S21, the relevant safety rules SRj are derived from the retrieved safety rules SRj so that instructions regarding the implementation of safety standards are generated. An instruction may comprise a command to implement a certain type of safety sensor for the automated machine.

Next, in step 22, it is determined if the combination of safety sensor description SDSi and machine description MDD according to the instruction generated in a step S21 leads to conflict. For example, an instruction may require a specific safety-sensor device to be employed in a position or range, which is unsuitable for the automation process.

If there is a conflict detected in step S22, for example the device description data DSDi, DDi and the machine description data MDD can be amended. In particular, expert data EXD can be used in order to resolve conflicts and provide conflict-free machine description data MDD including the required safety sensor data DSDi and technical-device description data DDi. For example, the database 103 shown in FIG. 1 can be implemented as an expert system for resolving those conflicts. The database or expert system 103 may deploy machine learning or other artificial intelligence algorithms.

In step S33, again a compliance check as referred to in FIG. 4 is performed. If the combination of safety sensors, technical devices and their arrangement in terms of the machine description data meet the safety standard, a clearance message is issued in step S34. Otherwise, a report is issued in step S51 referring to the safety issues that occurred during the process of FIG. 5.

It is understood that a match or conflict-free combination of machine description data MDD and device description data DSDi, DDi may form the basis for implementing the actual automated system including the technical devices and sensor devices.

Figure 6:
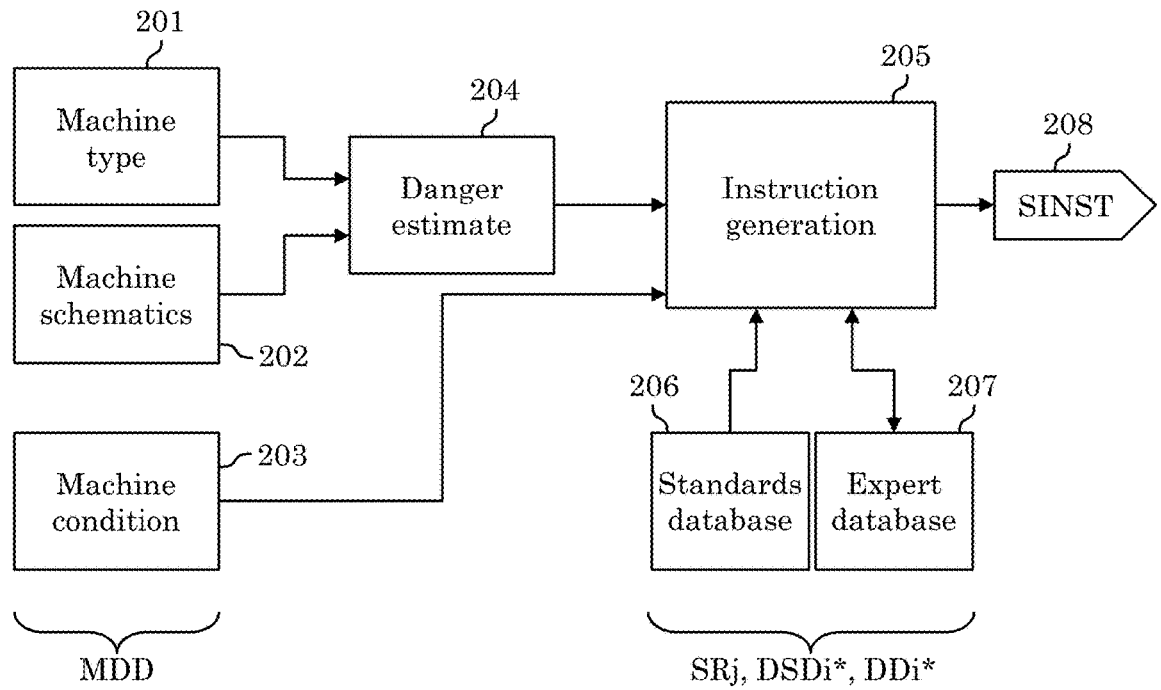
FIG. 6 shows a schematic process flow for an aspect of the third embodiment for a method for operating an automated machine.
Figure 7:
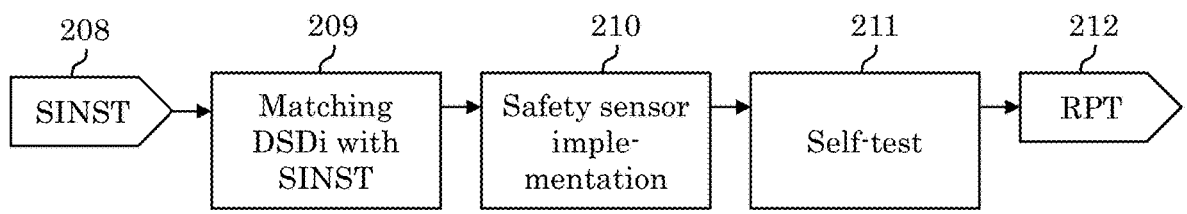
FIG. 7 shows a schematic process flow for another aspect of the third embodiment for a method for operating an automated machine.

Next, FIG. 6 and FIG. 7 show schematic process flows for aspects of the third embodiment for the method for operating the automated machine depicted in FIG. 5.

FIG. 6 and FIG. 7 show processes 201-211 that may be implemented by functional modules of the controller 102 (see FIG. 1). In particular, control processes may continuously monitor the operation of the automated machine 1. To this extent, in FIG. 6, machine description data MDD may include the type of the machine 1201, machine schematics 202, for example CAD data or 2D or 3D drawings of the machine.

Additionally, a machine condition monitoring process 203 determines the health condition, for example with respect to wear or aging effects in the machine parts.

A danger estimation process 204 considers the machine type 201 together with the overall configuration in terms of machine schematics 202 and identifies possible unsafe or danger-prone regions within the automated machine. The input gathered by those processes 201-204 are fed into an instruction generation process 205.

The instruction generation process may implement the method steps S21, S22 and S23 as shown in FIG. 5 and require access to a standards database 206 providing, for example, all relevant standard documents in a computer-readable format (see e.g. FIG. 3) on an expert database 207 that can include a process to resolve conflicts between safety standards and the machine description MDD. The standard database process 206 and expert database process 207, in particular, consider the description data DSDi, safety rules SRj and generate amended description data DSDi*, DDi*, which are combined into security instructions SINST (208). The security instructions SINST provide a draft for the automated machine according to the combined machine description data MDD*and device description data DSDi*, DDi* that fulfill all safety requirements, in particular in the zones estimated in the process 204.

The processes depicted in FIG. 6 and FIG. 7 can be considered a simulation of an automated system in terms of the respective description data and safety rules.

Next, as shown in FIG. 7, the security instructions 208 are used in a matching process (see step S33 in FIG. 5). The matching process 209 determines if the device description data DSDi, DDi and machine description data MDD proposed in the security instruction SINST match with each other and can be implemented in a real technical system.

Next, in the safety sensor implementation process 210, the safety sensor devices according to the safety-sensor description data defined in the matching process 209 are implemented and coupled within the automated machine 1.

Next, a self-test process 211 is executed where the automated system and the safety-sensor devices are self-tested and checked as to whether the safety sensors are accepted by the system or do not properly interact. A respective report RPT is issued in the reporting process 212 to a user or operator.

Figure 8:
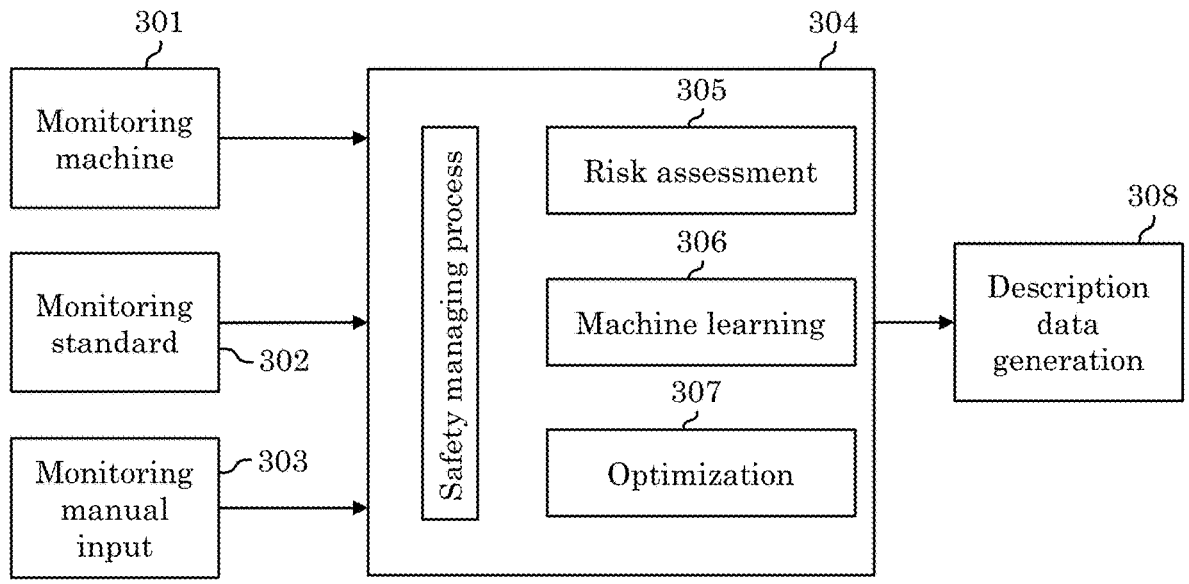
FIG. 8 shows a schematic diagram of an embodiment for a computer-implemented control device in a system for operating the automated machine.

As a result of the processes, the combination of safety sensors, technical devices and sensor devices according to the determined and chosen description data may be deployed in the technical system according to the automated machine. Next, the control device 102 may implement additional processes for monitoring the operation of the automated machine 1 set up according to the defined machine description and device descriptions. This is depicted in FIG. 8 where further processes implemented by the control device 102 (see FIG. 1) are shown.

In a machine-monitoring process 301, the operation of the automated machine 1 is monitored. For example, the process data including sensor and control data is obtained and logged for a specific time. From historical process data, deviations from proper functioning of the machine can be derived.

Further, a standards monitoring process 302 monitors if safety standards are changed, for example by the issuance of a new version of a particular standard. To this extent, the standard monitoring process 302, for example, regularly couples to a data depository where the relevant standard documents for automation systems can be retrieved.

Further, a manual input monitoring process 303, for example in terms of a human machine interface, or a computer interface, may receive manual input for altering the configuration of the monitored automated system.

The automated machine safety managing process 304 performs risk assessment process 305, a machine learning process 306, and an optimization process 303. For example, if an anomaly of the monitored automated machine is detected, the safety managing process 304 may trigger a full analysis or self-test of the safety-sensor devices included in the automated machine. Further, if a new or updated security rule is obtained in the standards monitoring process 302, an optimization of the operating automated machine may be necessary. As a result of the safety managing process 304, description data is generated in process 308.

Hence, the safety managing process 304 provides machine description data MDD including references to technical-device description data DDi and safety sensor description data DSDi that preferably lead to an efficient and safe operation of the automated machine according to the control algorithm implemented in the machine controller 10 (see FIG. 1).

Figure 9:
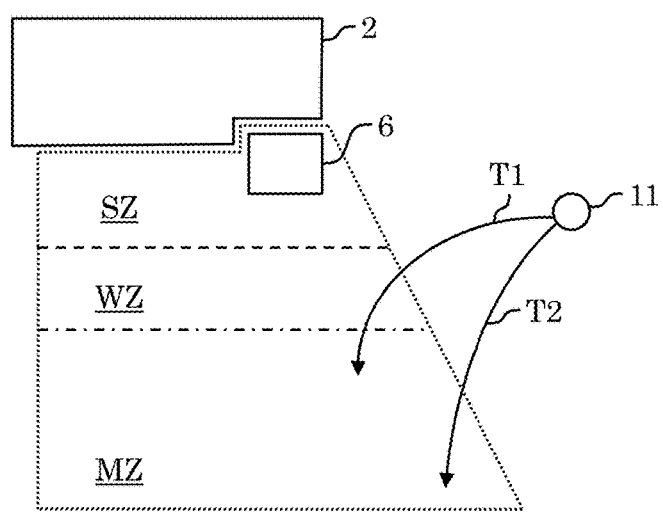
FIG. 9 shows a schematic diagram of a part of an embodiment for an automated machine operate according to embodiments of the disclosed methods/systems.

Optimizing the parameters comprised in the description data may be based on a machine learning process 306. For example, the occurrence of safety-relevant situations in a technical system can be detected by monitoring the process data. FIG. 9 shows an example of a section within an automated system or machine where a production unit 2 has an associated safety sensor 6 in terms of a time-of-flight sensor 6. The time-of-flight sensor 6 monitors the monitoring zone MZ indicated by the dotted lines. Within the monitoring zone MZ, there is a security zone SZ indicated by the section above the dashed line and a warning zone WZ indicated between the dashed line and the dashed-dotted line. For example, it is determined that the automated system implemented according to machine description data MDD, technical-device description data DD2 and safety sensor description data DSD6 reflecting the configuration of FIG. 9 fulfill all safety rules.

FIG. 9 also shows an operator 11 passing the monitored zone in a trajectory T1 or T2. The trajectory T1 passes the warning zone WZ and the monitored zone MZ. The trajectory T2 only crosses the monitored zone MZ. The machine learning process 306 may use the data obtained by the machine monitoring process 301 and observes that the user 11 is more frequently passing through the monitored zone MZ for the directory D2 than using route T1 entering the warning zone WZ.

This may result into an interruption of the technical device 2.

The safety managing process 306 using a machine learning module 306 may now decide that it is unnecessary to extend the warning zone in the orientation of FIG. 9 downwards until the dashed dotted line. The safety managing process 304 may generate a safety instruction or proposal to reduce the warning zone WZ towards the security zone SZ. As a result, the user 11 passing trajectory T1 will not trigger a warning any more. The safety managing process 304 determines if the proposed improved description data MDD, DSDi and DDi still comply with the relevant safety rules so that the optimized description data can be generated and implemented.

Figure 10:
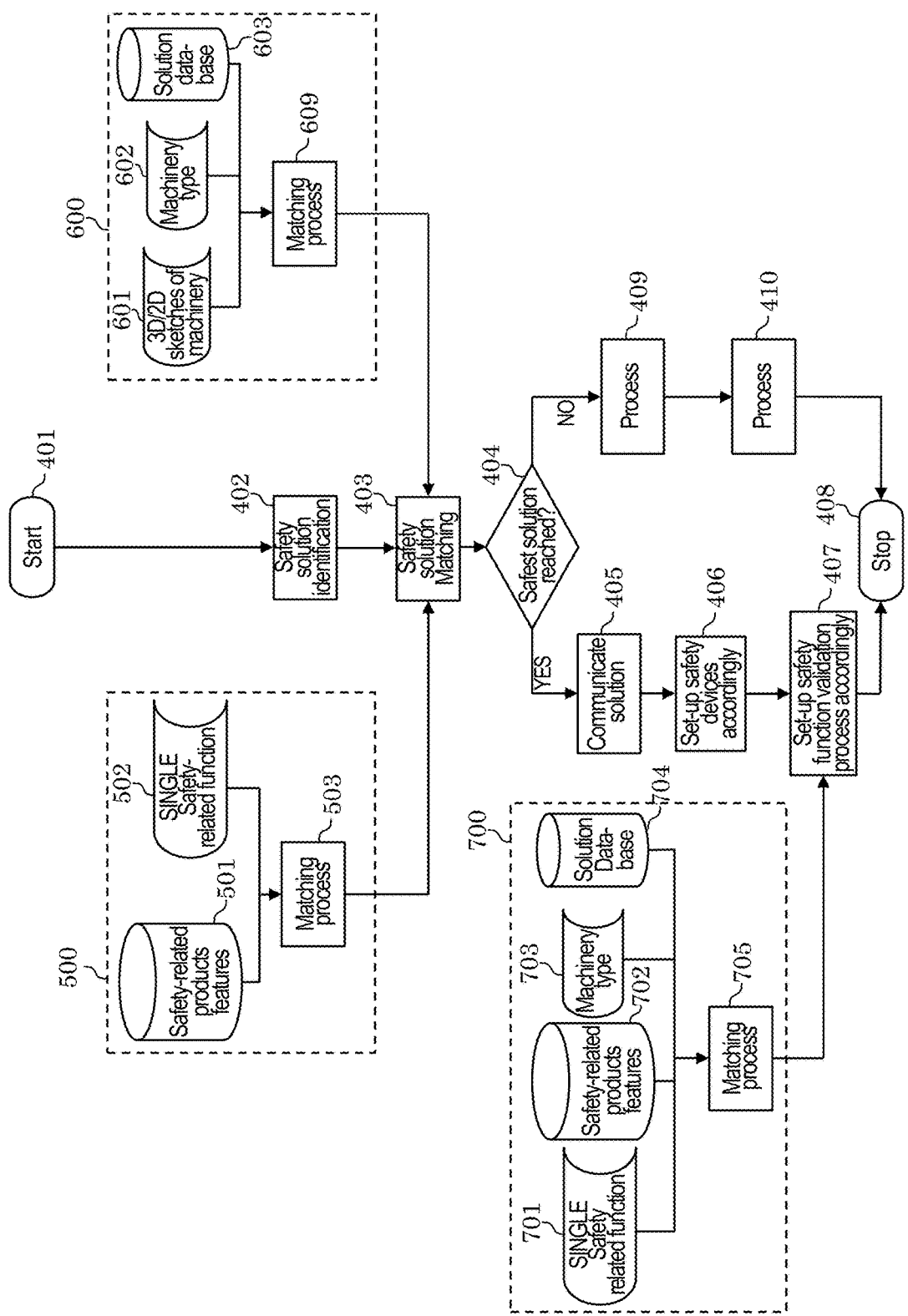
FIG. 10 shows a schematic process flow for aspects of a fourth embodiment for a method for operating an automated machine.
Figure 11:
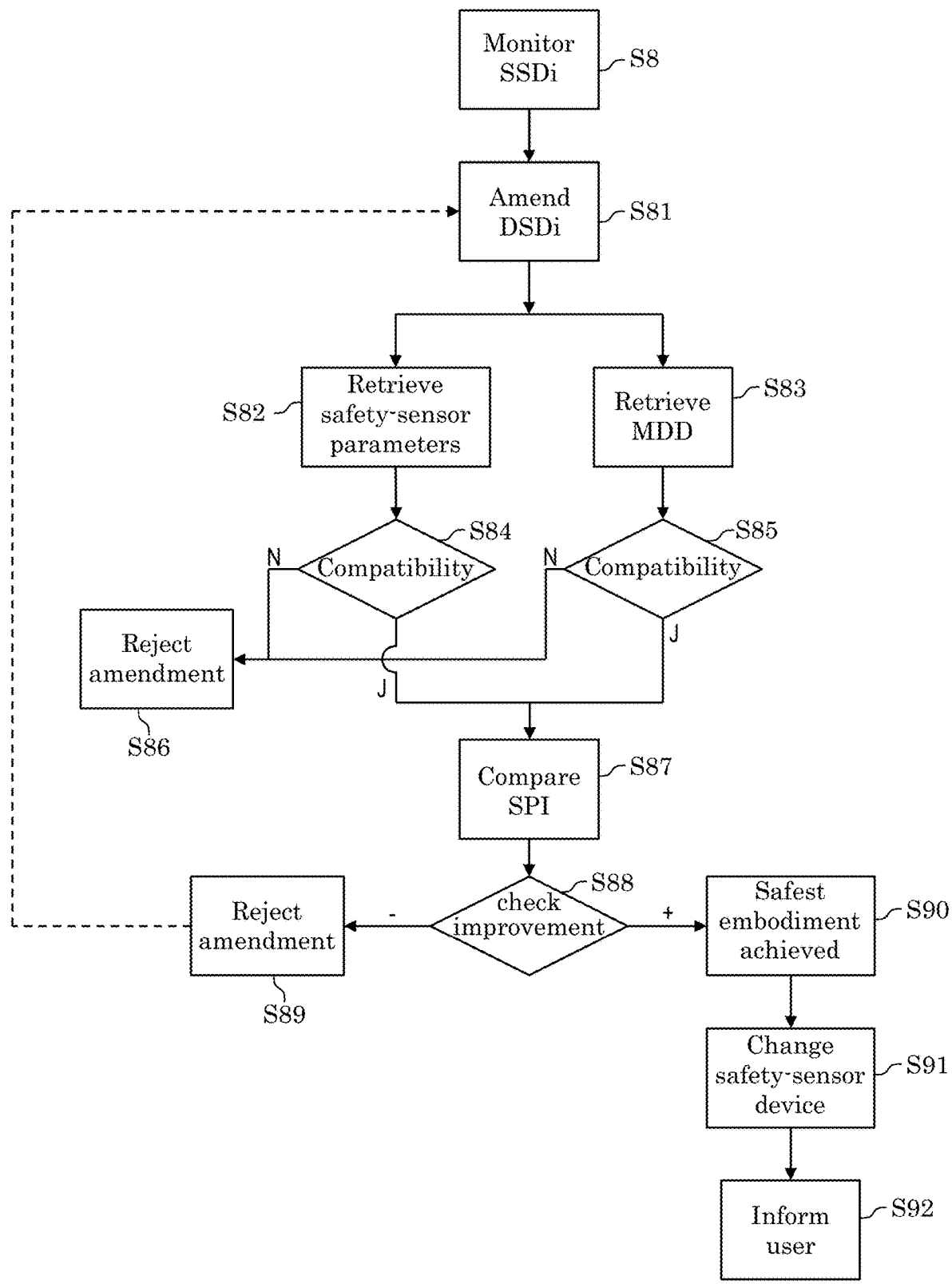
FIG. 11 shows a process flow involving method steps of a fifth embodiment for a method for operating an automated machine.

A process flow involving method steps implementing the processes depicted with respect to FIG. 8 and FIG. 9 is shown in FIG. 11. FIG. 10 shows processes involved in a safety managing process 304 as indicated in FIG. 8. In FIG. 10, a safety solution process starts in step 401. In a process 402, a safety solution is identified which is fed into the safety solution matching process 403. The safety solution matching process 403 obtains inputs from a safety feature matching process 500 and a machine configuration matching process 600. In the safety feature matching process 500, the safety-related product features in terms of a depository 501, safety-related product functions 502 and an internal matching process 503 are involved. In the machine configuration matching process 600, machine schematics, such as CAD data 601, machine types 602 and a solution database 603, are used by an internal matching process 604.

In a step 404, a safety performance indicator SPI is calculated and evaluated. If a safest solution for the considered machine configuration is found, a solution is communicated in step 405. Next, the safety devices, in particular the safety-sensor devices, are implemented or set up accordingly in step 406. In the next step 407, a validation process is executed which results in a validated description data to be used in a respective automated machine.

In this process 700, safety-related product functions 701, safety-related product features stored in a depository 702, the machine type 703 and the solution database 704 are involved in a matching process for the validation 705. If no safety solution is reached in step 404, various other matching processes are repeated in steps 409, 410.

FIG. 11 shows a more detailed view of a process flow involving method steps of a fifth embodiment of the method for operating an automated machine. The fifth embodiment comprises steps and aspects that can be executed in addition to the method steps depicted with respect to other embodiments. FIG. 11 elaborates on the steps involved in the safety managing process 304 shown in FIG. 8.

In a first step S8, safety sensor data SSDi is monitored. Alternatively, or additionally, other process data including the control data and/or the sensor data can be monitored.

This can be triggered, for example, by the machine learning of more likely and unlikely scenarios during the operation of the automated machine, as depicted in FIG. 9. In particular, referring to FIG. 9, the trajectory T1 occurring less frequent than trajectory T2 does not necessarily need to trigger a shutdown of the device 2. Hence, a proposal for amended safety sensor description data DSDi* is produced.

In step S82, additional sensor information can be retrieved, for example, from a database including device description data DDi according to a specific norm. In parallel, the machine description data MDD is retrieved in step S83. Retrieving may include inputting or downloading a respective description data file.

In steps S84 and S85, it is determined if the optimized or amended safety sensor description data DSDi* is compatible with security safety standards SR. Further, in step S85, it is determined if the machine description data require certain safety aspects or safety rules. If the machine description data MDD is incompatible with safety standards, the amendment is rejected in step S86. The same occurs, if in step S84 the proposed or amended safety sensor description data DSDi* is not compatible with the safety sensor parameters retrieved in step S82.

To this extent, in step S87, a safety performance indicator SPI is calculated. The safety performance indicated SPI, for example, provides for a scale from 0 to 10, where 10 is high safety and 0 refers to no safety.

If the SPI is increased by the amendment proposed in step S81, an improvement is determined in step S88. Thus, a safer or safe embodiment is achieved and identified in step S90. As a result, the safety-sensor device can be changed in step S91 according to the amended DSDi*.

Finally, the user is informed in step S92 in terms of a message or signal. If the improvement check in step S88 determines that the SPI is decreased, the amendment is rejected in step S89. Optionally, after rejecting the proposed amendment of step S81, the process can be reiterated indicated by the dashed arrow in FIG. 11.

The proposed methods, processes, systems and computer products may lead to an improved safety and/or efficiency of automated systems comprising safety devices in terms of safety-sensor devices and functional units in terms of technical devices.

In particular by automatically retrieving and analyzing safety standard documents to derive safety rules for the concrete automation system implementation, the implementation of proper safety standards is ensured. Further, the monitoring options for safety standards avoid an infringement of regulations, because the respective control or safety managing process automatically detects if standards are changed. Thus, governmental regulations are automatically obeyed and implemented in a timely fashion.

In modified embodiments, the location of the automated machine can be considered when downloading or retrieving the standard documents for the safety rule derivation. Further, the disclosed methods and systems can be implemented in a distributed fashion, i.e. the control device 102 (see FIG. 1) or the safety managing process 304 (see FIG. 8) can be implemented as software services or a cloud service. Alternatively, an industrial PCIPC may be functionalized in terms of a computer program product causing the IPC to execute any one of the embodiments of the method for controlling an automated machine.

It is understood that a reference in this disclosure to an industrial standard relates to the standard document at the time of filing this application. However, one may contemplate to apply the disclosed aspects to future versions of the respective standards or devices.

REFERENCE SIGNS LIST

CDi control data
DDi technical-device description data
DDi* amended technical-device description data
DSDi safety-sensor description data
DSDi* amended safety-sensor description data
EXD expert data
MDD machine description data
MDD* amended machine description data
MZ monitoring zone
RPT report
SRj safety rule (j=1 . . . n)
SDi sensor data (i=1 . . . )
SINST safety instructions
SPI safety performance indicator
SSDi safety-sensor data
SZ safety zone
T1, T2 trajectory
WZ warning zone
S0 start safety operation
S1 retrieving safety-sensor description data and technical-device description data
S11 retrieving safety-sensor description data
S2 retrieving safety rules/standards
S21 deriving safety instructions/requirements for machine configuration
S22 determining/checking if derived safety instructions comply with safety rules/standards
S23 amending machine and/or safety-sensor description for resolving safety rule breach
S3 determining/checking if safety sensors comply with safety standards
S31 retrieving/obtaining machine description data/machine profile/machine configuration
S32 determining/checking compatibility of safety sensors with machine configuration
S33 determining/checking if safety sensors and machine configuration comply with safety standards
S34 issuing safety clearance message
S35 end safety operation
S4 end safety operation
S5 issuing warning message
S51 generating report on safety issues of the automated machine
S6 end safety operation
S8 monitoring process data (control data, sensor data and/or safety-sensor data) and/or description data
S81 amending parameters in description safety-sensor description data and/or machine description data
S82 retrieving/gathering safety sensor information
S83 retrieving/gathering machine information
S84 determining/checking if amended safety-sensor description data comply with safety standards
S85 determining/checking if amended machine description data comply with safety standards
S86 rejecting amendment
S87 calculating safety-performance indicator (SPI) based on amended description data
S88 comparing SPI with SPI prior to the amendment
S89 rejecting amendment if SPI is deteriorated
S90 accepting amendment if SPI is improved
S91 implementing safety-sensor device according to amended safety-sensor description data
S92 informing user/generating report on safety improvement of the automated machine
1 automated machine
2, 3, 4, 5 technical device
6, 7, 8, 9 safety-sensor device
10 machine control device
11 operator
100 system for operating an automated machine
101 database device
102 control device
103 database device for expert data/system
201-203 machine description data
204 danger estimation process
205 safety instruction generation process
206 safety standards database
207 expert database
208 safety instructions for operating area
209 matching process
210 safety-sensor implementation process
211 self-test process
212 report generation process
301 machine monitoring process
302 safety standard monitoring process
303 input monitoring process 304 automated-machine safety management process
305 risk assessment section
306 machine learning section
307 safety optimization section
401 start safety solution process
402 identify safety solution
403 match safety solution
404 safest solution check
405 communicate safest solution
406 set-up safety devices according to safest solution
407 set-up safety solution validation process
408 stop safety solution process
409, 410 repeat safety solution process
500 safety feature matching process
501 depository of safety-related product features
502 safety-related product function
503 matching process
600 machine configuration matching process
601 machine schematics
602 machine types
603 solution database
604 matching process
700 safety solution validation process
701 safety-related product function
702 depository of safety-related product features
703 machine types
704 solution database

The invention claimed is:

1. A system for operating an automated machine, wherein the automated machine comprises:
a plurality of interacting technical devices, each technical device being implemented to perform an associated action, wherein each technical device has associated technical-device description data (DDi) including parameters characterizing the respective technical device; and
at least one safety-sensor device implemented to detect an observable state of a space in and/or around the automated machine and implemented to detect a safety issue in said space, a malfunction of the automated machine and/or the safety-sensor device, wherein each safety-sensor device has associated safety-sensor device description data (DSDi) characterizing the respective safety-sensor device;
wherein the system comprises:
a database device for storing a plurality of machine safety rules (SRj) in terms of relationships between safety-sensor devices and technical devices, in particular requirements between safety-sensor device description data (DSDi) and technical-device description data (DDi);
a control device implemented:
to retrieve the safety-sensor device description data (DSDi) and the technical-device description data (DDi) respectively associated to the safety-sensor devices and the technical devices comprised in the automated machine;
to retrieve, from the database device, safety rules (SRj) corresponding to the retrieved safety-sensor device description data (DSDi) and the technical-device description data (DDi);
to determine as to whether the retrieved safety-sensor device description data (DSDi) and the technical-device description data (DDi) comply with the retrieved safety rules (SRj); and
to generate at least one of a message, a warning, an instruction, or a report based on the determination.

2. The system of claim 1, wherein the control device is further implemented to:
receive machine-description data (MDD) characterizing at least the interaction of the technical devices; and
determine as to whether the retrieved safety-sensor device description data (DSDi), the technical-device description data (DDi) and the machine-description data (MDD) comply with the retrieved safety rules (SRj).

3. The system of claim 1, wherein the control device is implemented to monitor the technical devices, sensor devices which are part of the technical devices and/or the safety-sensor devices, in particular to detect a change in a state of a technical device, a sensor device, a safety-sensor device and/or an amendment in the technical-device description data (DDi) or the safety-sensor device description data (DSDi).

4. The system of claim 3, wherein a change includes a replacement, wear, age, life cycle, operational time, operational mode, operating range of the technical device, the sensor device, or the safety-sensor device.

5. The system of claim 3, wherein the control device is implemented to, in response to a detected change or amendment, determine if the applicable safety rules (SRj) is complied with.

6. The system of claim 1, further comprising a communications network, implemented to communicatively couple the control device, technical devices, sensor devices and/or the safety-sensor devices, in particular to retrieve the safety-sensor device description data (DSDi) and the technical-device description data (DDi), and transmit control data (CDj).

7. The system of claim 1, wherein the safety-sensor device description data (DSDi) and the technical-device description data (DDi) each has a predetermined format.

8. The system of claim 1, which is configured to receive the machine safety rules (SRj) in a predetermined computer readable format, to extract the machine safety rules (SRj) from safety-standard documents in text form, and to scan the machine safety rules (SRj) by means of a pattern or text recognition, and/or natural language processing.

9. The system of claim 1, wherein the control device is implemented to automatically analyze safety-standard documents and generate the safety rules (SRj) in a computer-readable predetermined format.

10. The system of claim 1, wherein determining if the retrieved safety-sensor device description data (DSDi), the technical-device description data (DDi), and machine description data (MDD) comply with the safety rules (SRj) comprises: a machine learning process, an expert system, monitoring and/or retrieving the safety-sensor device description data (DSDi), the technical-device description data (DDi), and the machine description data (MDD) from an external environment of the automated machine, and/or receiving manual input.

11. The system of claim 1, further comprising a further database device, implemented to provide expert data (EXD) for resolving conflicts between safety-sensor device description data (DSDi), technical-device description data (DDi), machine-description data (MDD) and/or safety rules (SRj); wherein the control device is implemented to:
detect a conflict between the retrieved safety-sensor device description data (DSDi), the technical-device description data (DDi) and the retrieved safety rules (SRj); and to
generate amended safety-sensor device description data (DSDi*), amended technical-device description data (DDi*), and/or amended machine-description data (MDD*), wherein the amended safety-sensor device description data (DSDi*), amended technical-device description data (DDi*), and amended machine-description data (MDD*) comply with the retrieved safety rules (SRj).

12. The system of claim 11, wherein the control device is implemented to:
calculate a safety-performance indicator (SPI) relating to the safety of the automated machine; and to
amend the safety-sensor device description data (DSDi), technical-device description data (DDi) and/or the machine-description data (MDD) such that the safety-performance indicator (SPI) is increased, wherein the higher the safety-performance indicator (SPI) becomes the more safety is improved.

13. The system of claim 1, wherein the automated machine further comprises a machine controller device implemented to
generate control data (CDi) for controlling the plurality of interacting technical devices, and to
receive sensor data (SD5) and/or safety sensor data (SSD6, SSD7, SSD8, SSD9) generated by the safety-sensor device and/or by a sensor device which is part of the technical device;
wherein the control data (CDi) is generated as a function of the sensor data (SD5) and the safety sensor data (SSD6, SSD7, SSD8, SSD9) according to a predetermined control algorithm (CALG).

14. The system of claim 13, wherein the control device is implemented to monitor the control data (CDi), the sensor data (SDi) and the safety-sensor data (SSDi).

15. The system of claim 14, wherein the control device is implemented to generate amended safety-sensor device description data (DSDi*), amended technical-device description data (DDi*) and/or amended machine-description data (MDD*) as a function of the monitored control data (CDi), sensor data (SDi), the safety sensor data (SSDi), the machine description data (MDD) and/or the safety rules (SRj).

16. The system of claim 1, wherein at least one of the interacting technical devices is an actuator device, a robotic device, a transport device, a conveyor device and/or a sensor device.

17. The system of claim 1, wherein at least one of the safety-sensor devices includes a light-curtain device, a time-of-flight sensor device, a motion detector, a radar transmission and/or detection device, an ultrasonic transmission and/or detection device, a laser scanner device, a photoelectric device, and/or a camera device.

18. An automated machine comprising:
the system according to claim 1;
the plurality of interacting technical devices; and
the safety-sensor devices, and
wherein the automated machine operates under control performed by the system.

19. A method for operating an automated machine, wherein the automated machine comprises:
a plurality of interacting technical devices, each technical device being implemented to perform an associated action, wherein each technical device has associated technical-device description data (DDi) including parameters characterizing the respective technical device; and
at least one safety-sensor device implemented to detect an observable state of a space in and/or around the automated machine and implemented to detect a safety issue in said space, a malfunction of the automated machine and/or the safety-sensor device, wherein each safety-sensor device has associated safety-sensor device description data (DSDi) characterizing the respective safety-sensor device;
wherein the method comprises:
retrieving, from a database storing a plurality of machine safety rules (SRj) in terms of relationships between safety-sensor devices and technical devices, in particular requirements between safety-sensor device description data (DSDi) and technical-device description data (DDi), the safety-sensor device description data (DSDi) and the technical-device description data (DDi) respectively associated to the safety-sensor devices and the technical devices comprised in the automated machine;
retrieving, from the database, safety rules (SRj) corresponding to the retrieved safety-sensor device description data (DSDi) and the technical-device description data (DDi);
determining as to whether the retrieved safety-sensor device description data (DSDi) and the technical-device description data (DDi) comply with the retrieved safety rules (SRj); and
generating at least one of a message, a warning, an instruction, or a report based on the determination.

20. A tangible, non-transitory computer-readable medium storing computer-readable instructions causing a computing system including one or more processing devices, in response to executing the computer-readable instructions, to:
retrieve, from a database storing a plurality of machine safety rules (SRj) in terms of relationships between at least one safety-sensor device and at least one technical device, in particular requirements between safety-sensor device description data (DSDi) and technical-device description data (DDi), the safety-sensor device description data (DSDi) and the technical-device description data (DDi) respectively associated to safety-sensor devices and technical devices comprised in an automated machine;
retrieve, from the database, safety rules (SRj) corresponding to the retrieved safety-sensor device description data (DSDi) and the technical-device description data (DDi);
determine as to whether the retrieved safety-sensor device description data (DSDi) and the technical-device description data (DDi) comply with the retrieved safety rules (SRj); and
generate at least one of a message, a warning, an instruction, or a report based on the determination;
wherein the automated machine comprises:
a plurality of interacting technical devices, each technical device being implemented to perform an associated action, wherein each technical device has associated technical-device description data (DDi) including parameters characterizing the respective technical device; and
at least one safety-sensor device implemented to detect an observable state of a space in and/or around the automated machine and implemented to detect a safety issue in said space, a malfunction of the automated machine and/or the safety-sensor device, wherein each safety-sensor device has associated safety-sensor device description data (DSDi) characterizing the respective safety-sensor device.

* * * * *